Patented Aug. 17, 1943

2,327,165

UNITED STATES PATENT OFFICE 2,327,165

METHOD OF POLYMERIZING ROSIN AND ROSIN ESTERS

Joseph N. Borglin, Wilmington, Del., assignor to Hercules Powder Company, Wilmington, Del., a corporation of Delaware No Drawing. Application April 23, 1941, Serial No. 389,893

6 Claims. (Cl. 260—97)

This invention relates to an improved method of polymerizing rosin and rosin esters.

Various procedures have been described in the art for contacting rosin and rosin esters with different polymerization catalysts to effect an increase in the melting point of the rosin or rosin esters. Thus rosins and rosin esters have been polymerized with use of agents such as for example, sulfuric acid, boron trifluoride, metallic halides, such as stannic chloride, etc. The polymerization treatment is usually carried out at relatively low temperatures, the desirable temperature depending, to a certain extent, on the particular polymerization catalyst employed. It has been observed that a discoloration accompanies the polymerization reaction and that the polymerized products obtained usually have a darker color than the original material. For this reason, it has been necessary to subject the polymerized products to a refining treatment to improve the color thereof. Such refining procedures have not been very satisfactory due to the fact that they do not satisfactorily improve the color and particularly because they have a tendency to decrease the melting point of the polymerized product, thereby defeating the original purpose of the polymerization treatment. Also, a material decrease in yield accompanies the known refining procedures.

It is an object of this invention to provide an improved method of polymerizing rosin and rosin esters.

It is another object to provide a method of producing polymerized rosin and rosin esters of lighter color.

Other objects of the invention will appear hereinafter.

It has been found in accordance with this invention that much of the discoloration accompanying the polymerization of rosin and rosin esters can be avoided by carrying out the polymerization reaction in the presence of a non-oxidizing atmosphere. This discovery was very surprising and unexpected in view of the fact that rosins and rosin esters themselves do not ordinarily undergo color degradation in the presence of oxygen at the temperatures used in the polymerization processes. Thus, it would not be expected that elimination of oxygen in the polymerization treatment would provide a polymerized product of improved color. Accordingly, in accordance with this invention the polymerization of rosin and rosin esters is carried out by contacting such materials with a polymerization catalyst in the presence of an inert gas.

The polymerization according to this invention may be carried out on any of the various grades of wood or gum rosin or acids contained therein with use of any of the known catalysts such as for example, sulfuric acid, organic substituted sulfuric acids, phosphoric acid, tetraphosphoric acid, boron trifluoride and its organic complexes, metallic halides as stannic chloride, zinc chloride, aluminum chloride, hydrofluoric acid or the acid sludge formed by treatment of rosin with sulfuric acid such as is described in an application of Clell E. Tyler, Serial No. 328,864, filed April 10, 1940. By use of these catalysts polymerized rosins ranging in melting point from about 85 to 175° C. may be prepared. In a similar manner, rosin esters, either monohydric or polyhydric alcohol esters, may be used in the improved polymerization process. Thus esters such as the methyl, ethyl, propyl, butyl, ethylene glycol, propylene glycol, glycerol, pentaerythritol, etc. esters of the various rosins and rosin acids may be employed.

The polymerization will generally be carried out on the rosin or rosin ester dissolved in an inert organic solvent. Suitable inert solvents are the saturated petroleum hydrocarbons as butane, petroleum ether, gasoline, hexane, etc.; aromatic hydrocarbons as benzene, toluene, xylene; cyclic hydrocarbons as cyclohexane, paramenthane, tetrahydronaphthalene, decahydronaphthalene; and chlorinated solvents as ethylene dichloride, etc. The most preferable solvents are the saturated petroleum hydrocarbons and the aromatic hydrocarbons.

In carrying out the polymerization in accordance with the improved method of this invention, the rosin or rosin ester dissolved in a suitable inert organic solvent is treated with a polymerization catalyst for a length of time sufficient to provide the desired increase in melting point in the presence of an inert atmosphere such as will be provided by passing a stream of an inert gas such as nitrogen, carbon dioxide, hydrogen, flue gas, etc., into the polymerization mixture. Preferably, the rosin or rosin ester solution prior to contacting with the polymerization catalyst will be saturated with the inert gas by bubbling the latter through the solution. After the polymerization, the catalyst will be removed by any of the well known means such as by decantation of the catalyst sludge as in the case of sulfuric acid, followed by water-washing, or by water-washing alone. The washing step will be carried out in an atmosphere of the inert gas. After complete removal of the catalyst the inert organic solvent is removed, for example by distillation and the distillation is carried out in an atmosphere of the inert gas. Thus, the polymerized product obtained is polymerized and purified in the presence of an inert atmosphere provided by an inert gas such as the gases mentioned above.

The improved polymerized product will be characterized by having a lighter color than is obtainable by carrying out the polymerization without use of the inert gas. Thus, it has been found that with any of the catalysts and with any of the polymerization processes a color improvement of the polymerized product is obtainable in each instance by carrying out the treatment in the presence of an inert gas. The other characteristics of the polymerized product will be substantially unaltered. Thus the process defined in accordance with this invention makes it possible to provide polymerized rosins and rosin esters of lighter color than heretofore obtainable without special refining treatment.

The following examples are illustrative of the improved method of polymerization. In the examples the amounts of ingredients are expressed in parts by weight unless otherwise indicated.

*Example 1*

Into 800 parts of a 35% solution of K wood rosin in benzene a rapid stream of carbon dioxide was passed at a temperature of 15° C. Seventy-four parts of 95% sulfuric acid were then added gradually with agitation to the rosin solution maintaining the temperature at 15° C. and the agitation continued for 30 minutes. A stream of carbon dioxide was passed through the polymerization mixture during the agitation. The sludge was then separated from the polymerized rosin solution and the latter refluxed for 1 hour with 90 parts of water while passing a stream of carbon dioxide through the solution. The benzene solution was then washed substantially free of acid in an atmosphere of carbon dioxide. The polymerized rosin was then recovered by distilling off the solvent by heating to a temperature of 220° C. under 15 to 20 mm. pressure while passing a stream of carbon dioxide into the solution. The polymerized rosin obtained had a melting point of 106° C., an acid number of 164, and a color of N+ on the rosin scale. By carrying out the polymerization in the same manner but without use of the carbon dioxide atmosphere the polymerized rosin obtained had a color of K.

*Example 2*

The polymerization procedure of Example 1 was duplicated except with use of cyclohexane in place of benzene as the solvent. The polymerized rosin obtained had a melting point of 87° C. and a color of 14 Amber on the Lovibond scale. A similar polymerization carried out without use of carbon dioxide atmosphere provided a polymerized rosin having a color of 27 Amber.

*Example 3*

To a solution of 800 grams of F gum rosin in 525 cc. of gasoline previously saturated with carbon dioxide, a solution of sulfuric acid consisting approximately of 340 cc. of commercial concentrated acid (approximately 1.84 specific gravity) and 136 cc. of water was added with stirring and while passing a stream of carbon dioxide through the solution. The temperature was kept between 30 and 32° C. by cooling. The rate of addition was such as to be completed within a half hour. Stirring was continued for one and one-half hours longer while continually passing a stream of carbon dioxide through the solution. The mixture was then stirred into 2000 cc. of gasoline saturated with carbon dioxide. Separation into a gasoline layer and an acid layer took place. The gasoline layer was washed with water in an atmosphere of carbon dioxide to remove any free or combined acid. The solution was then distilled at 15 to 20 mm. pressure to remove the gasoline, heating to a temperature of 220° C. The resulting polymerized rosin had a drop melting point of 120° C. and a color of WW. A similar preparation without use of an inert atmosphere gave a polymerized rosin having a color of K+.

*Example 4*

A solution of 200 parts of K wood rosin in 400 parts of benzene was saturated with carbon dioxide at room temperature and 20 parts of a boron trifluoride-ether complex were added with shaking at room temperature. After allowing the solution to stand at room temperature for 16 hours in an atmosphere of carbon dioxide, it was washed free of catalyst in a carbon dioxide atmosphere and the benzene removed by heating the solution to a temperature of 220° C. under 15 to 20 mm. pressure while passing a stream of carbon dioxide through the solution. The polymerized rosin obtained had an acid number of 166, a melting point of 103° C. and a color of 80 Amber+31 Red on the Lovibond scale. By carrying out the same polymerization treatment without use of the carbon dioxide atmosphere the polymerized rosin obtained had a color of 80 Amber+55 Red.

*Example 5*

A solution of 200 parts of K wood rosin in 300 parts of ethylene dichloride was saturated by passing nitrogen through the solution. Twenty parts of anhydrous aluminum chloride dissolved in 72 parts of ethylene dichloride which had been previously saturated with nitrogen were then added to the rosin solution at room temperature in a nitrogen atmosphere. The solution was allowed to stand for 72 hours at a temperature of approximately 0° C. in a nitrogen atmosphere. The solution was then washed with 1000 parts of 15% hydrochloric acid solution, followed by washing with water until the wash water was neutral, the washing being carried out in an atmosphere of nitrogen. The polymerized rosin was then recovered by heating the solution to a temperature of 220° C. under 15 to 20 mm. pressure while passing a stream of nitrogen through the solution. The polymerized rosin obtained had an acid number of 167, a melting point of 98° C. and a color of 80 Amber+6 Red on the Lovibond scale. In a comparable polymerization carried out without the use of nitrogen the polymerized rosin obtained had a color of 80 Amber+55 Red.

*Example 6*

A solution of 240 parts of ester gum in 160 parts of narrow range gasoline having a boiling range of 95 to 130° C. was heated to the reflux temperature while passing a rapid stream of carbon dioxide through the solution. The solution was then cooled to 30° C. and 240 parts of 30% sulfuric acid added. The mixture was stirred for 1½ hours at the same temperature while passing a stream of carbon dioxide through the solution. The polymerization mixture was then diluted with 330 parts of additional gasoline and the polymerized rosin solution then separated from the sludge. The solution was then refluxed for 1 hour with 200 parts of 10% sulfuric acid solution in an atmosphere of carbon dioxide. The solution was then washed free of acid in a carbon dioxide atmosphere and the solvent removed by heating to a temperature of 220° C. under 15 to 20 mm. pressure while passing a stream of carbon dioxide into the solution. The polymerized ester gum obtained had a melting point of 123° C. and a color of 25 Amber on the Lovibond scale. A comparable polymerization carried out without the use of the carbon dioxide provided an ester gum having a color of 59 Amber.

The improved polymerized rosins and rosin esters obtained in accordance with the process of this invention may be subjected to any further treatment desired. Thus, for example, they may be subjected to refining treatments if it is desired to further improve the color. Thus, the products may be refined by means of selective solvents or adsorbents.

It will be understood that the details and examples hereinbefore set forth are illustrative only and that the invention as broadly described and claimed is in no way limited thereby.

What I claim and desire to protect by Letters Patent is:

1. A method for polymerizing a material selected from the group consisting of rosins and rosin esters, which comprises dissolving the said material in an inert organic solvent, saturating the solution with an inert gas, contacting said solution with a polymerization catalyst in an inert atmosphere to effect polymerization of the said material, removing the catalyst in an inert atmosphere, washing the said solution with water in an inert atmosphere to remove the catalyst, evaporating the solvent in an inert atmosphere, and recovering a polymerized material of improved color.

2. A method for polymerizing a rosin which comprises dissolving the rosin in an inert organic solvent, saturating the solution with an inert gas, contacting said solution with a polymerization catalyst in an inert atmosphere to effect polymerization of the said rosin, removing the catalyst in an inert atmosphere, washing the said solution with water in an inert atmosphere to remove the catalyst, evaporating the solvent in an inert atmosphere, and recovering a polymerized rosin of improved color.

3. A method for polymerizing a rosin ester which comprises dissolving the rosin ester in an inert organic solvent, saturating the solution with an inert gas, contacting said solution with a polymerization catalyst in an inert atmosphere to effect polymerization of the said rosin ester, removing the catalyst in an inert atmosphere, washing the said solution with water in an inert atmosphere to remove the catalyst, evaporating the solvent in an inert atmosphere, and recovering a polymerized rosin ester of improved color.

4. A method for polymerizing a rosin which comprises dissolving the rosin in an inert organic solvent, saturating the solution with an inert gas, contacting the solution with a sulfuric acid catalyst in an inert atmosphere to effect polymerization of the rosin, removing the catalyst in an inert atmosphere, washing the solution with water in an inert atmosphere to remove the catalyst, evaporating the solvent in an inert atmosphere, and recovering a polymerized rosin of improved color.

5. A method for polymerizing a rosin which comprises dissolving the rosin in an inert organic solvent, saturating the solution with an inert gas, contacting the solution with a boron fluoride catalyst in an inert atmosphere to effect polymerization of the rosin, removing the catalyst in an inert atmosphere, washing the solution with water in an inert atmosphere to remove the catalyst, evaporating the solvent in an inert atmosphere and recovering a polymerized rosin of improved color.

6. A method for polymerizing a rosin which comprises dissolving the rosin in an inert organic solvent, saturating the solution with an inert gas, contacting the solution with an aluminum chloride catalyst in an inert atmosphere to effect polymerization of the rosin, removing the catalyst in an inert atmosphere, washing the solution with water in an inert atmosphere to remove the catalyst, evaporating the solvent in an inert atmosphere and recovering a polymerized rosin of improved color.

JOSEPH N. BORGLIN.